(12) United States Patent
Chvala et al.

(10) Patent No.: US 7,451,107 B1
(45) Date of Patent: Nov. 11, 2008

(54) BUSINESS-TO-BUSINESS ELECTRONIC COMMERCE CLEARINGHOUSE

(75) Inventors: Richard J. Chvala, Midlothian, VA (US); Mason A. Moore, Richmond, VA (US); Michael F. Giesler, Midlothian, VA (US)

(73) Assignee: Supply Chain Connect, LLC, Houston, TX (US)

( * ) Notice: Subject to any disclaimer, the term of this patent is extended or adjusted under 35 U.S.C. 154(b) by 0 days.

(21) Appl. No.: 09/493,794

(22) Filed: Jan. 28, 2000

(51) Int. Cl.
*G06Q 40/00* (2006.01)
(52) U.S. Cl. ....................................................... 705/37
(58) Field of Classification Search ................. 705/1, 705/26, 29, 35–45
See application file for complete search history.

(56) References Cited

U.S. PATENT DOCUMENTS

| 5,794,207 A | 8/1998 | Walker et al. |
| 5,826,242 A | 10/1998 | Montulli |
| 5,897,620 A | 4/1999 | Walker et al. |

OTHER PUBLICATIONS www.Chemconnect.com, company profile and press release.*
"Job Losses Mount", p. 34, Chemical Week, Jan. 5, 2000.
"It's Not the Product That's Different, It's the Process", pp. 1-4, The New York Times, Dec. 15, 1999.
"Coevolving—At Last, a Way to Make Synergies Work", pp. 91-101, Harvard Business Review, Jan./Feb. 2000.
"Hypermediation: Commerce as Clickstream", pp. 46-47, Harvard Business Review, Jan./Feb. 2000.
"Priorities Shift Away from ERP", pp. 44-45, Chemical Week, Sep. 29, 1999.
"Internet Startups Have Chemicals in their Sites", p. 33, Chemical Week, Sep. 29, 1999.
"Chemical Firms Seek Out E-Commerce Niches", p. 37, Chemical Week, Sep. 29, 1999.
"E-Commerce Startups Converge on Chemicals", p. 39, Chemical Week, Aug. 4, 1999.
"E-Commerce Land Grab", p. 32, Chemical Week, Sep. 29, 1999.
"Information Technology", pp. 33-42, Chemical Management Review, Sep./Oct. 1999.
"How GM, Ford Think the Internet Can Make Splash in Their Factories", pp. 1-6, The Wall Street Journal, Dec. 3, 1999.
"E-ssembly Lines—How GM, Ford Think Web Can Make Splash On the Factory Floor", The Wall Street Journal, Dec. 3, 1999.
"XML and EDI: Peaceful Co-Existence", pp. 1-10, XML Solutions Corporation, 1999.

* cited by examiner

*Primary Examiner*—Richard Weisberger
(74) *Attorney, Agent, or Firm*—Knobbe, Martens, Olson & Bear, LLP

(57) ABSTRACT

A business-to-business transaction clearinghouse integrates the traditional point-to-point business supply chain at the clearinghouse. The clearinghouse provides cost effective access to a wide variety of members and includes value-added services. Members of the clearinghouse can include trading members, members that help the trading members ship their products, and banking members. The clearinghouse facilitates business among the trading members by providing a single point of contact for all transactions. The clearinghouse can be specific to an industry, such as the chemical industry. Multiple industry specific clearinghouses may form a network clearinghouses to effectively create one larger and more general business-to-business electronic commerce community.

10 Claims, 8 Drawing Sheets

BUSINESS-TO-BUSINESS ELECTRONIC COMMERCE CLEARINGHOUSE

BACKGROUND OF THE INVENTION

1. Field of the Invention

The present invention relates generally to electronic commerce, and more specifically, to business-to-business electronic commerce.

2. Description of Related Art

In the business world, transaction costs associated with the buying and selling of products and raw materials can be significant. A single sale often requires a number of communications between the purchasing and selling entities, each requiring employee time to process, record, and approve the communications.

As an example of a typical business transaction, consider the situation in which a first company wishes to purchase a quantity of chemicals from a chemical supplier. A typical supply chain process for this type of transaction is illustrated in FIG. 1. The supply chain includes a number of component transactions between the purchasing company 101 and its supplier 102. These component transactions and an example of the documents associated with them are listed in box 103. Supporting third party services 105, such as banking and shipping services, are also involved in the transaction.

The purchasing company 101 may begin by making inquiries of its current suppliers to determine which one can supply the chemicals at the best price. This step often entails a lengthy request for proposal (RFP) process and many purchaser-supplier visits. The supplier and the purchaser agree on the specifications of the desired chemical and on the handling of any regulatory requirements. A purchase order is then issued by the purchasing company to officially place the order. The purchase order is processed and acknowledged by the supplier.

Actually shipping the chemical may involve a significant logistical effort. For example, a third party shipping company is selected, and in connection with shipping the chemicals, a shipping note and a bill of lading are generated and given to the shipping company. Additional documents such as a certificate of analysis, which verifies that the purchased chemicals are the ones ordered, and a material safety data sheet, which includes handling and safety information for the chemical, may also be generated by the supplier and transmitted to the purchaser.

Arrival of the chemicals at the purchaser triggers the creation of additional documents, such as a delivery receipt, an invoice, and eventually, payment by the purchasing company to the supplier for the delivered chemicals. The conventional supply chain process can thus be cumbersome, labor intensive, and relatively expensive.

A network of purchasers and suppliers such as those illustrated above can be conceptualized as a point-to-point network of trading entities. Such a network is illustrated graphically in FIG. 2. Each trading entity 201 communicates directly with other entities in the network via communication lines 202. Communication lines 202 represent, for example, communication by phone, facsimile, mail, or EDI messages (described below).

In an effort to automate records relating to purchasing and selling, many companies use enterprise resource planning (ERP) systems. ERP refers to a broad set of activities supported by multi-module application software that help a business manage the important parts of its operations, including product planning, parts purchasing, maintaining inventories, interacting with suppliers, providing customer service, and tracking orders. An ERP system can also include application modules for the finance and human resources aspects of a business.

Although an ERP may help to automate a company internally, ERP systems of various companies are often not compatible with one another. Accordingly, documents that are to be exchanged with outside companies are often printed as hard copies, transmitted to the other company over communication lines 202 in the form of, for example, a facsimile, and manually entered in the other companies ERP system. Thus, although purchasers and suppliers may be automated internally, their systems are usually isolated from an ability to communicate with each other. Thus, despite automation at both companies, a "manual gulf" over communication lines 202 still exists between companies. Companies traverse the gulf between systems by manual processes such as mail, email, fax, meetings, and phone calls.

One attempt to take advantage of computerized ERP systems and to eliminate the manual gulf between companies is the electronic data interchange (EDI) protocol, which is a standard format for exchanging business commerce data. In an EDI exchange, automated systems, such as ERP systems at two of entities 201, exchange EDI messages over communication lines 202. An EDI message contains a string of data elements, each of which represents a singular fact, such as a price, product model number, and so forth, separated by delimiters. The entire string is called a data segment. One or more data segments framed by a header and trailer form a transaction set, which is the EDI unit of transmission (equivalent to a message). A transaction set often consists of what would usually be contained in a typical business document or form, such as a purchase order. The EDI standard is available from the Data Interchange Standards Association, of Virginia.

EDI, however, has not been widely adopted. It has proven to be relatively expensive to install and maintain, particularly for small companies. Further, as illustrated in FIG. 2, EDI only provides point-to-point automation and does nothing for integrating suppliers and customers in a business community. As a result, EDI is presently only used by a small fraction of the companies involved in business to business commerce.

Thus, there is a need in the art to automate the supply chain of businesses in a way that is both efficient and widely available to a large number of member companies.

SUMMARY OF THE INVENTION

Systems and methods consistent with the principles of the present invention address the needs identified above by integrating the traditional point-to-point business supply chain at a clearinghouse.

More particularly, one aspect of the present invention is directed to a system for facilitating business-to-business transactions. The system comprises a network coupled to a plurality of member businesses and a clearinghouse computer server. The clearinghouse is associated with the members and coupled to the members through the network. The clearinghouse receives and forwards electronic messages transmitted between at least two of the plurality of members, the messages corresponding to communications in a business-to-business transaction that relate to initiation of the transaction, and at least one of order fulfillment for the transaction and payment processing for the transaction.

A second aspect of the present invention is directed to a computer network comprising a plurality of trading members, at least one banking member, at least one shipping member, and a clearinghouse. The clearinghouse is coupled to the trading members, the banking member, and the shipping member. Communications between the trading members, banking members, and shipping members is routed through the clearinghouse, and the clearinghouse includes software components for managing the services provided by the banking and shipping members to the trading members.

Another aspect of the present invention is a method that includes generating messages relating to business-to-business commerce transactions at an enterprise resource planning computer system, including generating messages relating to the management of supply chain activities of a company, the messages corresponding to communications in a business-to-business transaction. The method further includes converting the messages generated by the enterprise resource planning computer system into extensible markup language (XML) messages and transmitting the converted messages over the Internet to a clearinghouse that processes the converted messages and provides services related to order fulfillment for the transaction and payment processing for the transaction.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

DETAILED DESCRIPTION

The following detailed description refers to the accompanying drawings that illustrate the embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

As described herein, a business-to-business transaction clearinghouse integrates the traditional point-to-point business supply chain at the clearinghouse. The clearinghouse provides cost effective access to a wide variety of member computer systems and includes value-added services. The clearinghouse facilitates business among trading partners by providing a single point of contact for all transactions. Any member of the clearinghouse can conduct business with any other member by sending the transaction through the clearinghouse.

Clearinghouse Architecture and Implementation

Figure 3A:
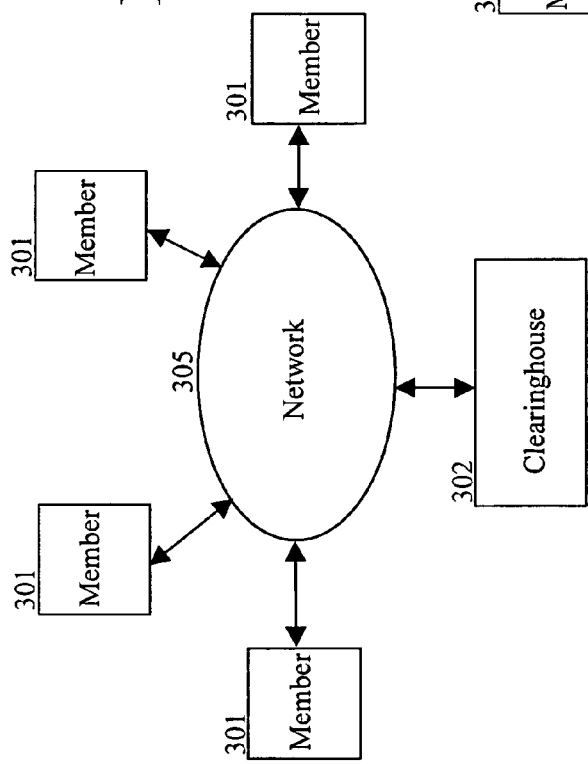
FIG. 3A is a high level diagram illustrating a network of trading members connected to a clearinghouse in a manner consistent with the present invention.

FIG. 3A is a high level diagram illustrating a network of trading members connected to a clearinghouse in a manner consistent with the present invention. Trading members 301 may be any company or other entity wishing to trade using clearinghouse 302. Clearinghouse 302 is connected to each of members 301 via network 305, such as the Internet. The interaction of members 301 with each other and with clearinghouse 302 is described in more detail below.

Figure 1:
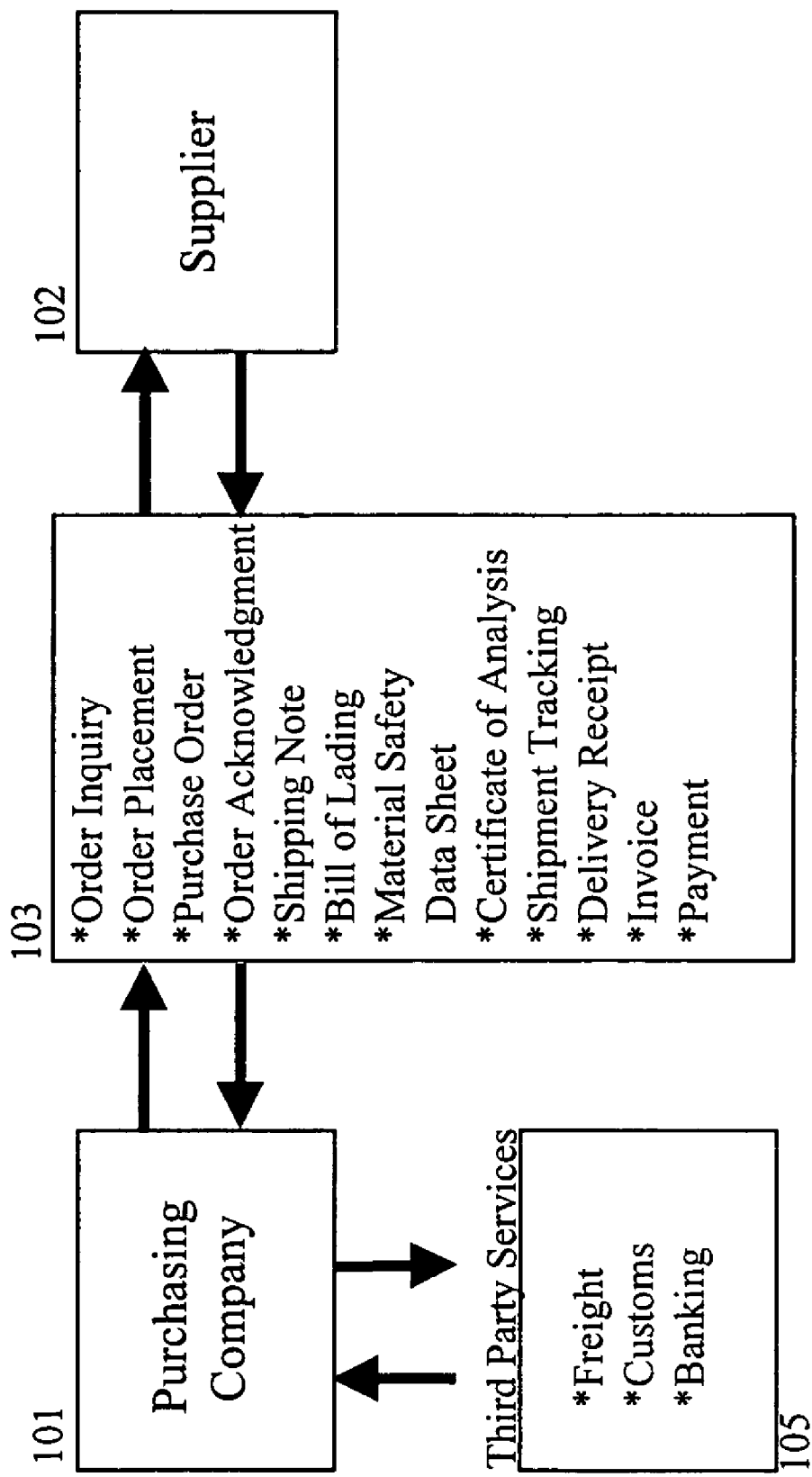
FIG. 1 is a diagram of a typical supply chain process in a business-to-business transaction.
Figure 2:
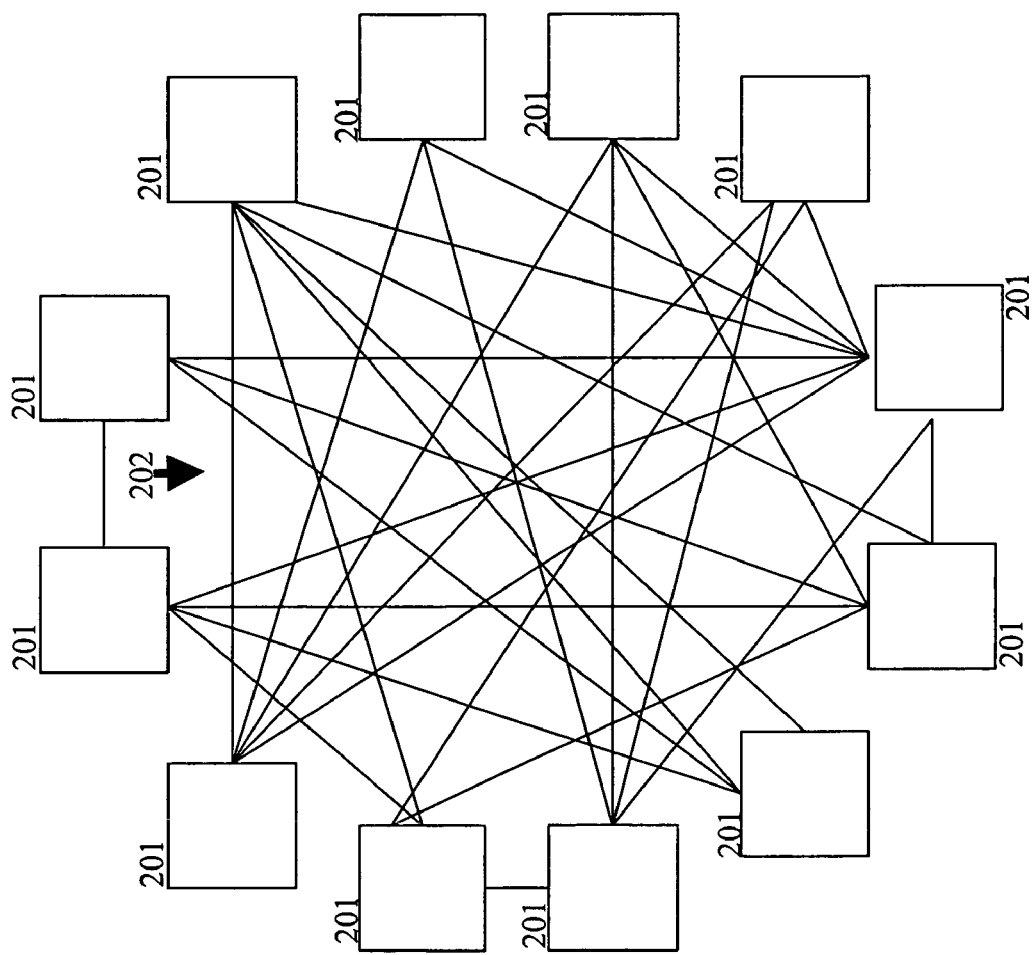
FIG. 2 is a graphical illustration of a conventional point-to-point network of purchasers and suppliers.
Figure 3B:
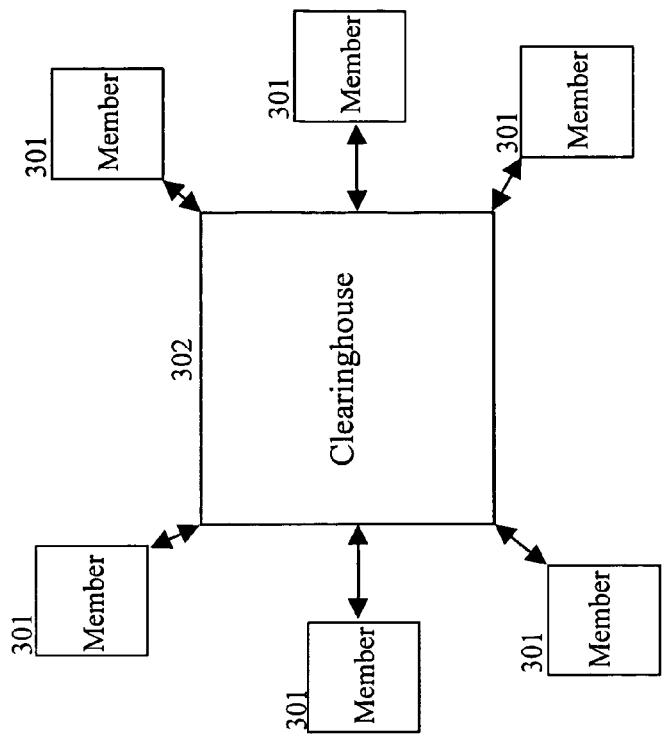
FIG. 3B is a diagram conceptually illustrating the functional relationship of the trading members and the clearinghouse.

FIG. 3B is a diagram conceptually illustrating the functional relationship of clearinghouse 302 with trading members 301. As shown, clearinghouse 302 functions as an intermediary for communications between trading members 301. In contrast to the point-to-point network shown in FIG. 2, each of trading members 301 only has to be configured to communicate with a single entity—clearinghouse 302.

Figure 4:
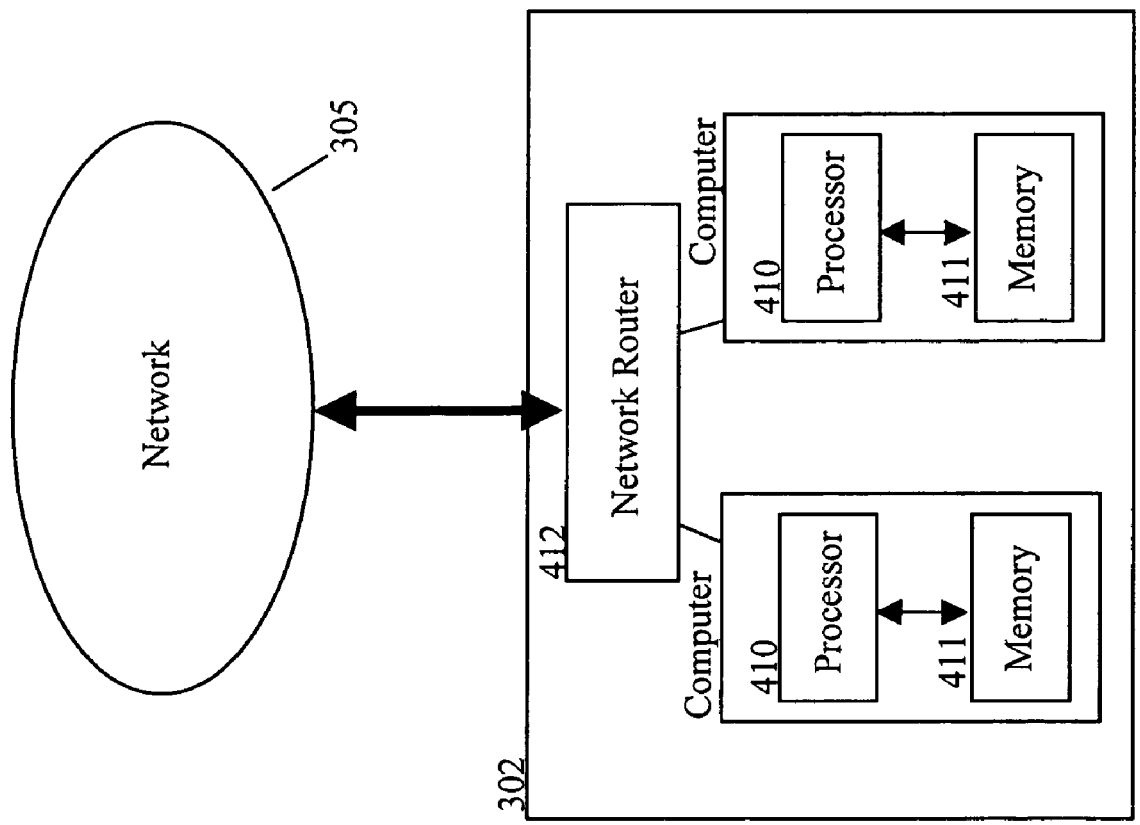
FIG. 4 is a diagram illustrating a hardware implementation for the clearinghouse.

FIG. 4 is a diagram illustrating an exemplary hardware implementation for clearinghouse 302. Clearinghouse 302 may generally be implemented as a server computer system including one or more processors 410 operatively coupled to computer memories 411. Processors 410 executes program instructions stored in computer memories 411. Information destined for external systems connected to network 305 (such as trading members 301), may be transmitted to network 305 by network router 412.

Processors 410 may either accept program instructions from a computer storage device (e.g., optical or magnetic disk) or from network 305. BIOS code (i.e., computer instructions) causing the system to implement the disclosed techniques may be programmed into a non-volatile portion of computer memory 411. The BIOS may be programmed when the system is manufactured or may be later delivered via a computer readable medium.

Processors 410 can be any of a number of well known computer processors, such as processors from Intel Corporation, of Santa Clara, Calif. More generally, clearinghouse 302 may be implemented using any of well known computing platforms designed to interact with devices on the network.

Figure 5:
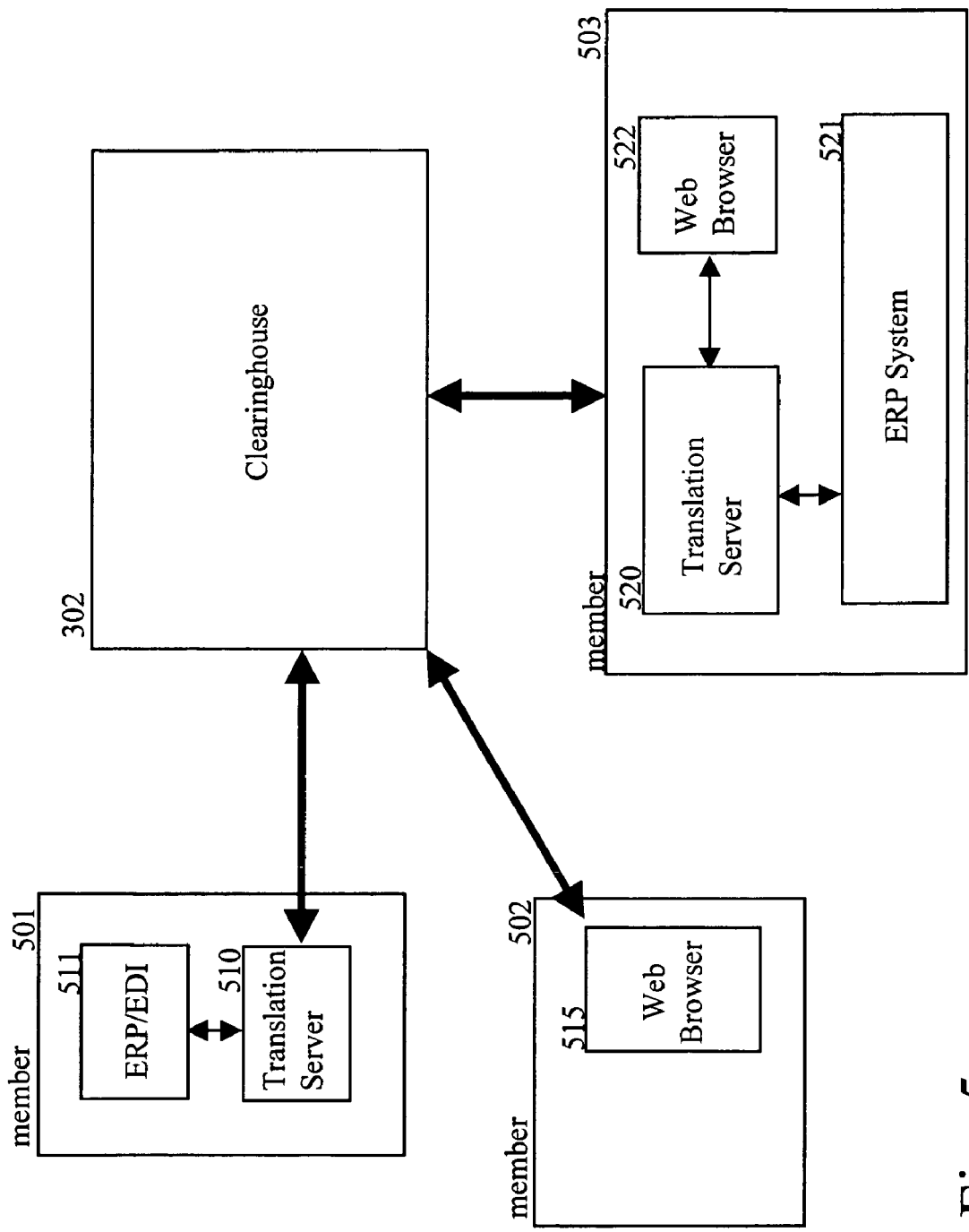
FIG. 5 is a diagram illustrating the interaction of the clearinghouse with various exemplary trading members of the network.

FIG. 5 is a diagram illustrating the interaction of clearinghouse 302 with various exemplary trading members 501, 502, and 503. Assume trading member 501 is a corporation with a previously installed ERP system that includes the ability to use EDI. Trading member 502 is a smaller supplier and does not have an ERP system or EDI capability. Trading member 503 is a third party service provider such as a bank or a shipping company; assume they use an ERP system but do not have EDI capability.

To facilitate cost effective and universal communication with clearinghouse 302, clearinghouse 302 preferably communicates with each of trading members 501-503 using a common standard such as the XML standard. XML (Extensible Markup Language) is a well known descriptive language that allows for the transmission of information, over intranets or the Internet, that includes both formatting information and information describing the data. In comparison to EDI, XML is generally considered to be easier to learn and program and requires the user to invest less in computer hardware.

Because trading member 501 may already have invested significantly in an ERP system and in EDI processing, clearinghouse 302 interacts with member 501 without requiring member 501 to revamp its existing computing infrastructure.

Instead, translation server 510 is connected to ERP/EDI computer system(s) 511 of member 501. Translation server 510 translates EDI or member proprietary messages received from computer system 511 into XML and forwards the XML data to clearinghouse 302. Similarly, translation server 510 converts XML data received from clearinghouse 502 to a form understandable by computer 511. Translation server 510 is customized to operate with ERP/EDI computer system(s) 511. In this manner, by using translation servers 510 to convert supply chain information from a member specific format to a format understood by clearinghouse 302, multiple trading members with disparate computer systems can all communicate with one another simply by installing a single translation server.

Computer systems that convert EDI messages to XML data are known in the art. One such system is available from XMLSolutions Corporation, of McLean, Va.

Alternatively, the trading member's internal computer system 511 may be originally designed to operate using the message format of clearinghouse 302. In this situation, translation server 510 would not be necessary. Additionally, as one of ordinary skill in the art will recognize, although translation server 510 is illustrated as a stand alone computer server, it could equivalently be implemented as software in the member's computer system 511.

In contrast to trading member 501, trading member 502 does not have an automated transaction processing system. However, trading member 502 may still communicate with clearinghouse 302 using a web browser 515. As previously mentioned, information transmitted in XML can include both formatting information and descriptive information describing the data. The formatting information allows web browser 515 to display the contents of the XML document. XML documents may be interactive, allowing trading member 502 to input and transmit information to clearinghouse 302.

Member 503 connects to clearinghouse 302 in a manner similar to trading member 501. A translation server 520 converts information from the members ERP system 521 and interfaces ERP 521 with clearinghouse 302. Web browser 522 may concurrently be used by member 502 to interact with clearinghouse 302. In particular, translation server 520 may forward information relating to functionality not implemented in ERP 521 to web browser 522.

Clearinghouse Services

Figure 6:
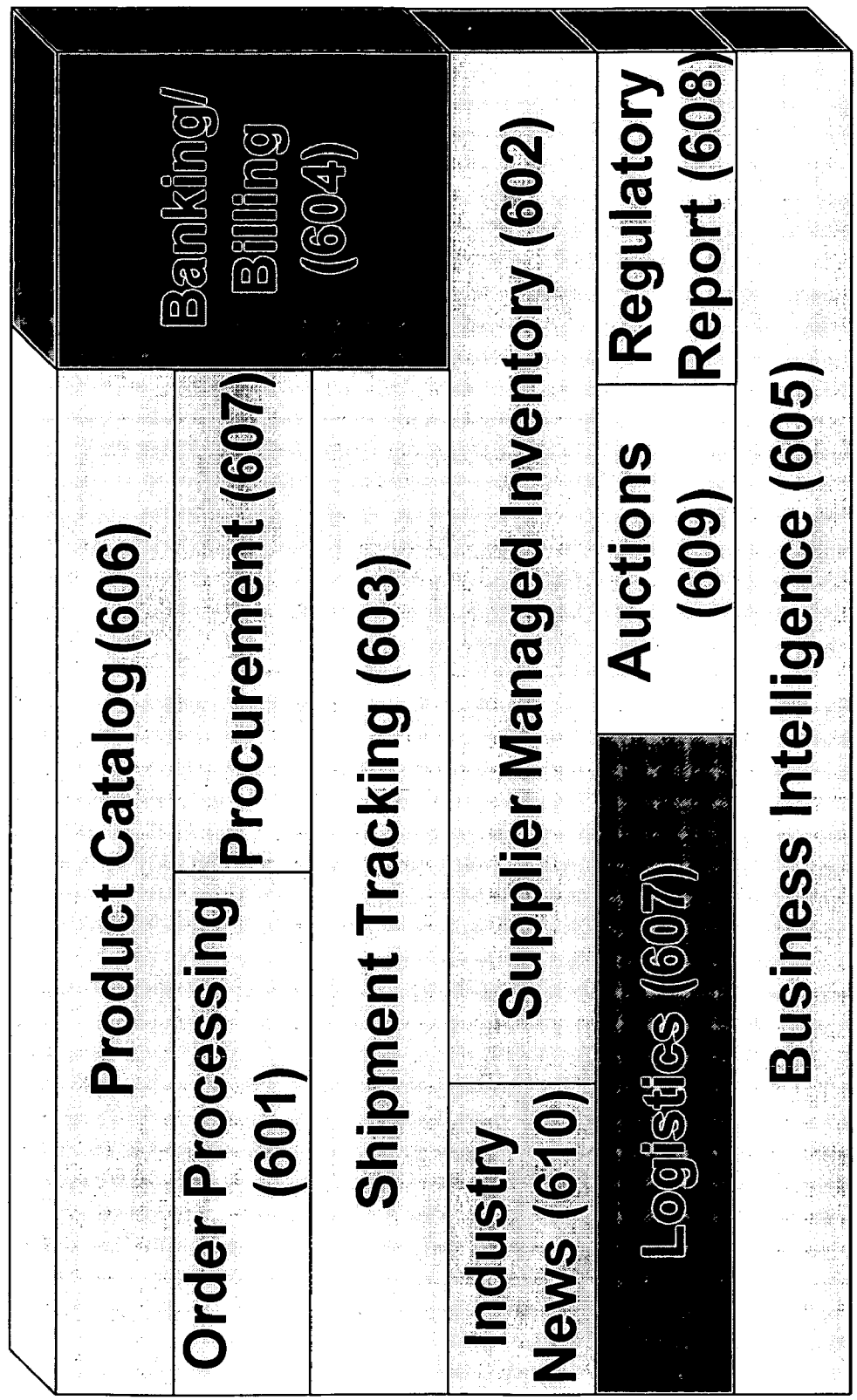
FIG. 6 is a diagram illustrating exemplary services performed by the clearinghouse shown in FIGS. 3-5.

Clearinghouse 302 provides a number of electronic commerce services to its members. These services are implemented by software running at clearinghouse 302. FIG. 6 is a diagram graphically illustrating examples of some of the services that clearinghouse 302 may implement. The illustrated services include:

A. Order Processing (component 601)
B. Supplier Managed Inventory (SMI) Services (component 602)
C. Shipment Tracking (component 603)
D. Banking/Billing (component 604)
E. Business Intelligence (component 605)
F. Product Catalogs (component 606)
G. Logistics Procurement (component 607)
H. Regulatory Reporting (component 608)
I. Product Auctions (component 609)
J. Industry News (component 610)

Trading members may select a combination of these services to provide an optimized solution for their particular situation. For example, one member may initially decide to use only the shipment tracking functions while another member uses order processing, shipment tracking, and business intelligence.

The services provided by the clearinghouse 302 may be integrated so that the more services a member uses, the greater the value. For example, if a member uses both order processing and shipment tracking, the member may be able to link directly from the order to shipment tracking information.

Each of the services shown in FIG. 6 will now be discussed in more detail.

A. Order Processing Component 601

Order processing component 601 automates the processing of documents traditionally associated with commercial purchases by storing and forwarding electronic versions of these documents to the network members. A non-exhaustive list of the documents processed by order processing component 601 include: (1) order inquiries, (2) purchase orders, (3) blanket purchase orders, (4) scheduling agreements, (5) order acknowledgements, (5) shipping notices, (6) bills of lading, (7) delivery receipts, (8) invoices, and (9) invoice payments. Other industry specific documents may also be processed by the order processing component 601. For example, in the chemical industry, documents such as certificates of analysis and material safety data sheets may also be transmitted between the parties through clearinghouse 302.

Figure 7:
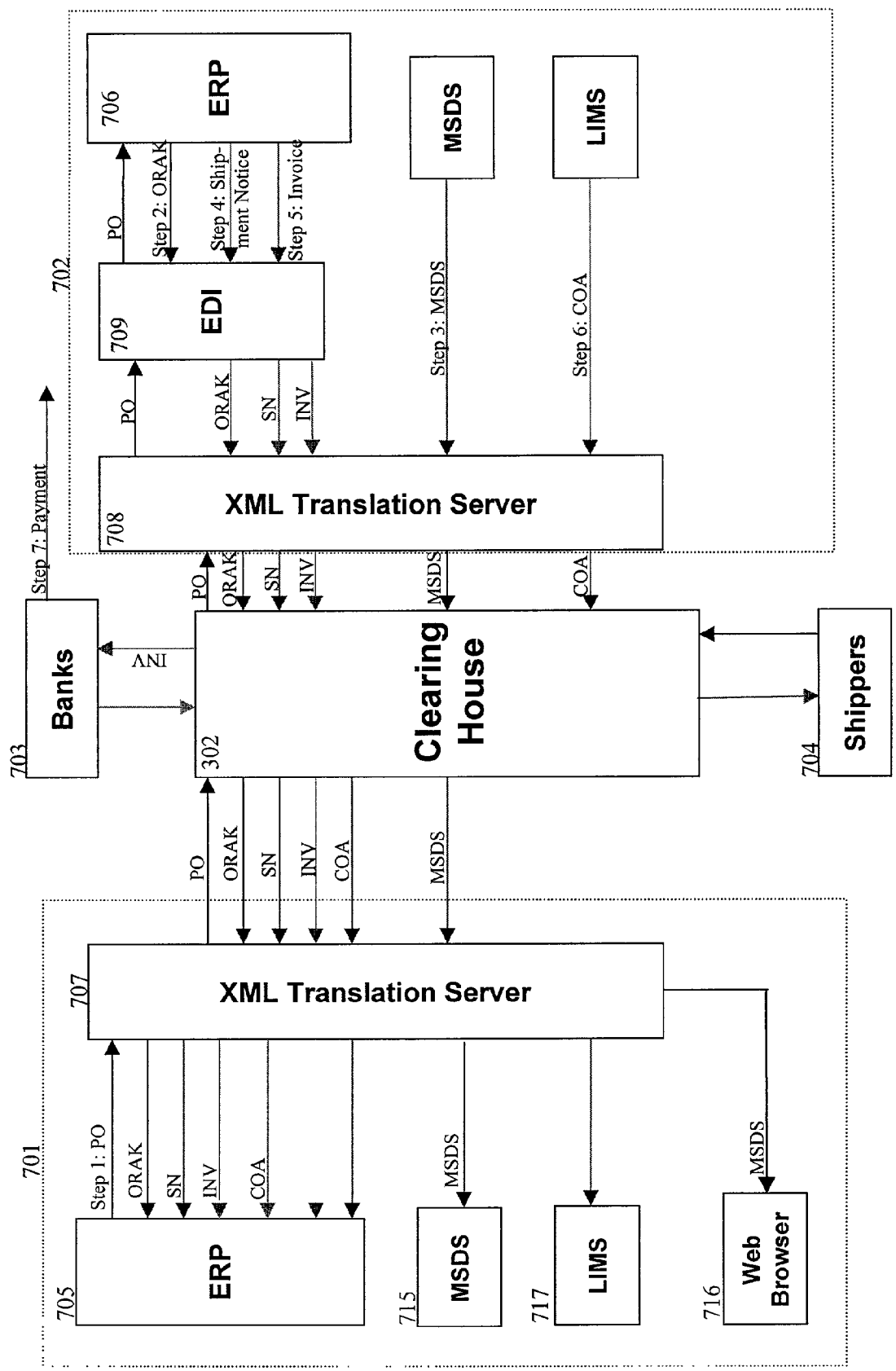
FIG. 7 is a diagram illustrating an exemplary business-to-business transaction between members in the clearinghouse network.

An exemplary transaction will now be described with reference to FIG. 7. As shown, trading members 701 and 702, each having internal ERPs 705 and 706, and translation servers 707 and 708, are connected to clearinghouse 302. Member 702, in addition to ERP system 706, uses an EDI system 709. Members 701 and 702 may also have other specialized hardware or software, such as MSDS computer 715, on which material safety data sheets are stored, or laboratory information management system (LIMS) 716, at which laboratory related research or analysis software executes. Companies that provide third party support, such as a bank 703 and a shipping and logistics company 704, are also members in the network.

Assume that trading member 701 (the customer), wishes to purchase 100 gallons of a chemical from member 702 (the supplier). Trading member 701 enters the information for a purchase order for the chemicals into ERP 705, which generates the purchase order and transmits it to translation server 707 (Step 1). The clearinghouse 302 receives the order, reads the supplier information and sends the order to member 702. At member 702, the purchase order is translated into an EDI message by translation server 708 and then forwarded to the supplier's EDI system 709 and ERP 706.

Member 702, upon accepting the order, sends an order acknowledgement message (ORAK) back through the clearinghouse to member 701 (Step 2). If a material safety data sheet (MSDS) is required for the order, it may also be similarly sent through clearinghouse 302 (Step 3). If ERP 705 is not configured to handle MSDSs, it may be stored at an alternate computer 715 or viewed via web browser 716.

On the shipping date, member 702 sends a shipping notice to member 701 through clearinghouse 302 (Step 4). The shipping notice may be automatically generated by ERP 706 when it receives input indicating shipment of the order. With the shipping notice, documents such as the certificate of analysis, (Step 5), and the invoice, (Step 6), may also be sent.

B. Supplier Managed Inventory (SMI) Services (Component 602)

In general, SMI services refer to a suppliers monitoring of the inventory of its customer, and automatically shipping products to the customer as the inventory is depleted. Clearinghouse 302 facilitates these functions by providing customers the ability to automatically transmit the necessary inventory information from its ERP system to the clearinghouse and/or the supplier. Trading members who previously had an in-house SMI system can fully automate the transfer of SMI related data to their suppliers.

As an example of an SMI system, assume that trading member 702 (the supplier) provides SMI services to trading member 701 (the customer). Members 701 and/or 702 may begin by setting up an account for member 701 at the clearinghouse 302 by providing the SMI component 602 with the initial account information, such as the products being managed, the locations of the products, the minimum order quantity, and the product reorder criteria (e.g., the inventory depletion level at which to reorder product). Member 701 periodically updates SMI component 602 with SMI related data such as inventory information and inventory forecasts. When the updated information provided by member 701 meets the reorder criteria set in SMI component 602 (e.g., the actual inventory level is below the reorder point), SMI component 602 transmits a purchase order to member 702. Member 702 may then fill the order.

By locating the SMI functionality at the clearinghouse 302, the customer's inventory information does not need to be transmitted to the supplier. Accordingly, because clearinghouse 302 is a trusted third party, customers may feel more secure that their confidential inventory related information is not compromised.

As an alternative implementation of SMI component 602, instead of notifying the supplier when it is time to resupply product, SMI component 602 may simply pass the inventory data to the supplier. In this implementation, the supplier decides, based on the received invoice information, when to resupply the product.

C. Shipment Tracking (Component 603)

Multiple shipping and logistics companies may provide shipping services to members of clearinghouse 302. Shipment tracking component 603 communicates with these companies to allow members to track the shipment of their products. Shipment information can be provided by shipment tracking component 603 to the members by, for example, requiring the shipping companies, such as shipping member 704, to periodically update shipment information stored in component 603. If a shipment is falling behind schedule, shipment tracking component 603 may automatically send a message informing the appropriate trading member of the tardiness of the shipment.

Alternatively, shipment tracking component 603 may wait for shipment tracking requests from a trading member, such as member 701, before requesting the shipment tracking information from shipping member 704.

Trading members using the order processing component 601 of clearinghouse 302 may preferably check the shipment status from any order-related document. If they do not use the order processing component, they may be assigned a shipment tracking number used to query shipment tracking component 603.

D. Banking/Billing (Component 604)

In addition to the trading members and the shipping and logistics companies, companies in banking related businesses may join the clearinghouse network and provide members integrated banking related services. For example, invoices sent by one member may be automatically copied by banking component 604 to the banking member used by the receiver of the invoice. This is illustrated graphically in FIG. 7, in which the invoice from member 702 (step 5), is transmitted through clearinghouse 302 to both trading member 701 and banking member 703. At trading member's 701 instruction, banking member 703 may electronically pay trading member 702 (Step 7).

A number of value added services may be offered by the member banks. A non-exhaustive list of such services include:

(1) Summary invoicing. Banking member 703 may prepare summary invoices, such as a monthly summary invoice, for its members.

(2) Consolidation of transactions. A member's transactions over a period may be consolidated. The member would then receive one payment (or debit) representing the net of its sales and its purchases in the network.

(3) Purchase of receivables. Banking members may buy account receivables from members that do not wish to carry their receivables. Multiple banking members may bid for the account receivables of the trading member. Because information related to the invoice and payment record of vendors is processed by clearinghouse 302, banking members bidding for account receivables can form intelligent estimates of the value of the receivables. For example, if a banking member knows that all the vendors in a particular member's account receivables have a good credit history, the bank may be willing to bid close to the nominal face value of the receivables.

(4) Automated Payments. All payments made by banking members from one member of the network to another member may be made on the specific day specified by the member.

(5) Credit Checks on Customers.

In summary, integrating banks, such as banking member 703, into clearinghouse 302, provides trading members the ability to electronically pay and receive payment notifications through their existing computer systems. Moreover, the banking members can use the integration provided by the clearinghouse to provide value added services to the trading members.

E. Business Intelligence (Component 605)

By virtue of its position as a hub of the electronic commerce activities of its members, clearinghouse 302 contains a significant amount of information that may be useful to its members. For example, the average selling price of a certain chemical may be a valuable piece of information to members that buy and sell that chemical.

Business intelligence component 605 mines aggregate data relating to electronic commerce through the clearinghouse. Such data may include price information, service guidelines, information on new markets, and industry information (e.g., total sales of product groups by region). Additionally, access to industry information such as pricing models, price-volume elasticity curves, and regional use information may also be provided by business intelligence component 605. In general, any information or aggregation of information passing through clearinghouse 302 may be mined by business intelligence component 605 and provided to the network members. One restricting factor on the information provided to the members is the practical limitation of not divulging confidential or proprietary information.

Two areas in which intelligently mined aggregated data may be particularly useful to members of clearinghouse 302 include supply chain sourcing scorecards and company specific business/market data.

Supply chain scorecards relate to member feedback regarding the performance of the members. Scorecard information provided by business intelligence component 605 may include information such as: (1) integrated supply chain data, (2) order product/service quality metrics, (3) order to arrival on-time reporting (i.e., member feedback relating to whether orders from the member tend to arrive on time), and (4) customer-supplier non-conformance process and systems (i.e., member feedback relating to whether members conform to the agreed terms of their transactions).

Further, business intelligence component 605 may provide members access to their own transactions. The members may use such information by periodically importing it into an in-house business intelligence system. Members without such an in-house system may view the information from business intelligence component 605 through a web browser.

F. Product Catalog (Component 606)

Product catalog component 606 implements a searchable catalog of products being sold by the trading members. In particular, product catalog component 606 stores product information uploaded by the trading members. Information in product catalog 606 may then be searched by other members of the network.

Catalog searches through catalog component 606 may be viewed by the trading members through an interface such as a web browser or, after translation by a translation server, at the members ERP system or other member computer system.

G. Logistics Procurement (Component 607)

Logistics procurement component 607 assists members in finding the best shipping company and shipping method for any particular transaction. Shipping members 704 may update procurement component 607 with their rates and with the availability of their shipping lines. The trading members can then use procurement component 607 to compare shipping costs and delivery schedules of competing shippers to find the best match for each shipment. Shipping members 704 benefit from procurement component 607 by having a large and easily accessible market for their services.

As an alternative to the shipping members 704 pre-entering their shipping rates into procurement component 607, the shipping members may view shipment requests input by trading members and in response submit shipment proposals to the trading members.

H. Regulatory Reporting (Component 608)

Certain industries, such as the chemical industry, are highly regulated by federal and state agencies. Laws, such as the Clean Air Act or the Toxic Substance Control Act, or regulations promulgated by agencies acting pursuant to a law, may require complying companies to file periodic (e.g., daily, weekly, or monthly) or event specific reports with the agencies. For example, the EPA or other agencies may require reports relating to the volume of certain chemicals sold, bioaccumulation, exposure indexes, community right to known issues, emission credit reporting, and product registration.

Regulatory reporting component 608 enables clearinghouse members to efficiently and reliably handle their regulatory reporting obligations. In particular, a member wishing to use regulatory reporting component 608 may set up an account in regulatory component 608 including information such as when the report should be sent and the information required in the report. To help facilitate this process, regulatory reporting component 608 may include a variety of pre-stored templates, each including the basic information necessary for a particular regulatory report.

After setting up an account, the member simply transmits the information required in the report to clearinghouse 302, either automatically from the ERP or manually from a web browser. At clearinghouse 302, regulatory reporting component 608 saves the information, and when appropriate, generates the regulatory report. Clearinghouse 302 may then transmit the report to the appropriate regulatory agency.

I. Product Auctions (Component 609)

As previously described, clearinghouse 302 helps to initiate transactions between trading members by providing a universal infrastructure through which buyers can communicate with their suppliers. Product catalog component 606 further facilitates the initiation of transactions by providing an electronic catalog of products. Product auction component 609 gives buyers and sellers another option to initiate transactions.

Through auction component 609, sellers may put products up for auction. In particular, auction component 609 allows sellers to input information relating to the product they wish to sell, and allows buyers to input bids on these products. One of the benefits of auction component 609 is that it gives sellers the opportunity to quickly sell excess capacity, thus helping them to optimize their capacity schedules.

J. Industry News (Component 610)

In addition to facilitating efficient transactions between members, clearinghouse 302 may function as an industry specific portal through which members may receive or generate industry related news and information. For example, content stored by industry news component 610 may be transmitted to members at their request and viewed at a web browser.

As described above, clearinghouse 302 integrates a variety of members, possibly each using disparate computer systems, into a single business community. The clearinghouse assists in the matching of buyers and sellers, order fulfillment, and payment processing. Clearinghouse 302 functions to automate the cumbersome supply chain traditionally followed by businesses and provides value added services to its members.

One implementation of clearinghouse 302 is a clearinghouse specific to the chemical industry. In this situation, functions unique to the chemical industry such as transmitting certificates of analysis and material safety data sheets (MSDS), are provided by the clearinghouse. A more general clearinghouse, a clearinghouse specific to other industries, or a network of industry specific clearinghouses, may also be implemented.

Figure 8:
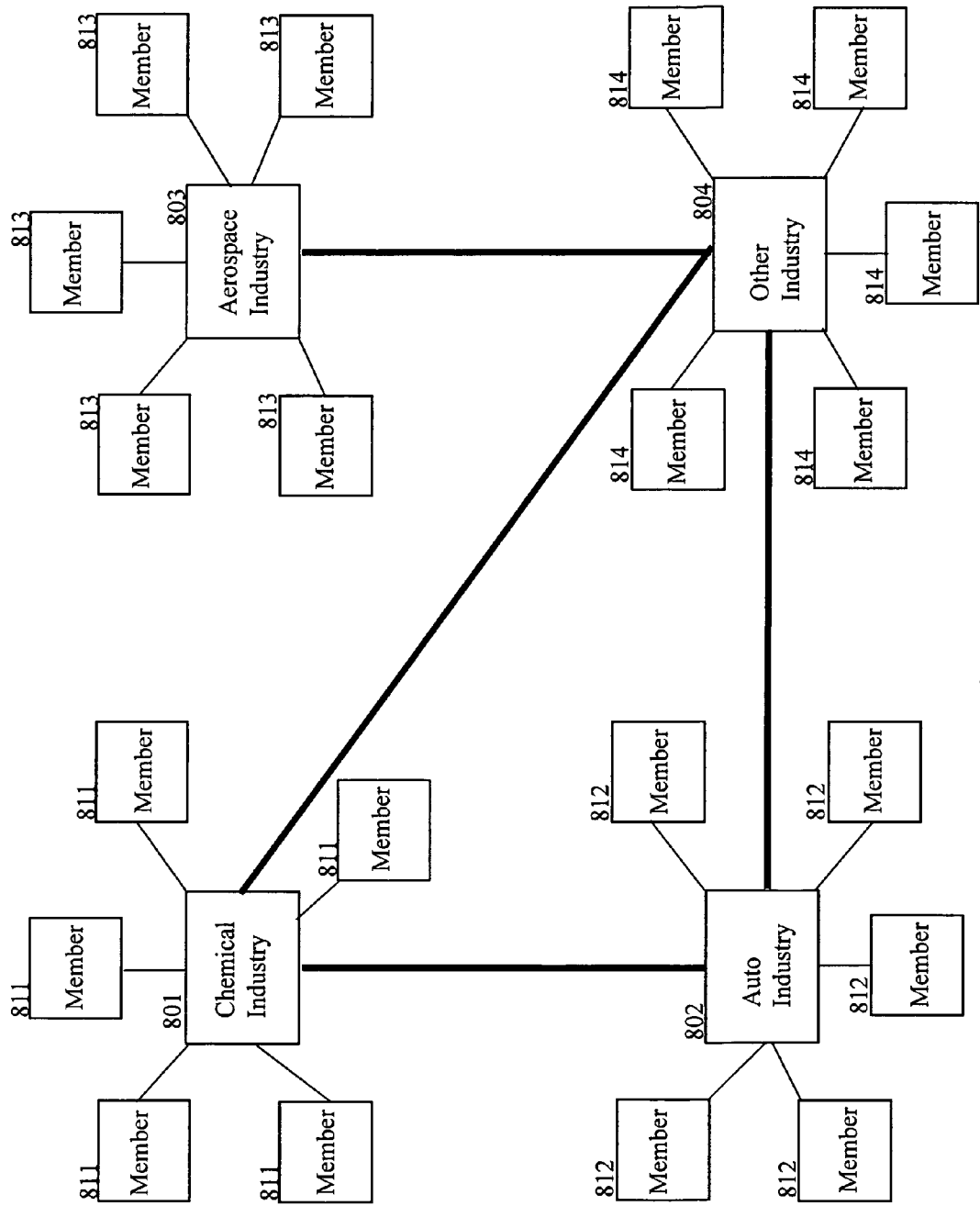
FIG. 8 is a diagram illustrating a network of a plurality industry specific clearinghouses.

FIG. 8 is a diagram illustrating a network of industry specific clearinghouses 801 (chemical industry), 802 (auto industry), 803 (aerospace industry), and 804 (other industry), and their respective trading members 811-814. Clearinghouses 801-804 are linked to one other to allow members of one clearinghouse to participate in transactions with members of another clearinghouse. For example, members 812 of auto industry clearinghouse 802 may at times wish to purchase products from chemical companies. Accordingly, by linking clearinghouse 801 and 802, one of members 812 may purchase chemicals from one of members 811. Procedures specific to the chemical industry, such as the transmission of a material safety data sheet, would be handled by chemical clearinghouse 801.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed is:

1. A system for facilitating chemical supplier transactions comprising:

a network coupled to a plurality of member businesses;

a clearinghouse computer server associated with the member businesses and coupled to the member businesses through the network, the clearinghouse computer server configured to receive and forward electronic messages transmitted between at least two of the plurality of member businesses, the messages corresponding to communications in a chemical supplier transaction that relate to initiation of the chemical supplier transaction, and at least one of order fulfillment for the chemical supplier transaction and payment processing for the chemical supplier transaction;

a web browser associated with at least one trading member, wherein the web browser is configured to allow the trading member to generate data and transmit the data through the web browser to the clearinghouse computer server in an original format compatible with a clearinghouse format;

an enterprise resource planning system configured to manage resources of at least another trading member, including product supply chain management; and a translation server coupled to the enterprise resource planning system and to the clearinghouse computer server, the translation server configured to convert data in a format of the enterprise resource planning system into a converted format of the clearinghouse computer server and forward the converted data to the clearinghouse computer server, wherein the converted data and the original format data correspond to communications between a first trading member and a second trading member that relate to initiation of a chemical supplier transaction, order fulfillment for the chemical supplier transaction, and payment processing for the chemical supplier transaction.

2. The system of claim 1, wherein the messages corresponding to communications in the chemical supplier transaction relate to both order fulfillment for the transaction and payment processing for the transaction.

3. The system of claim 1, wherein the messages include at least one of a purchase order, a purchaser order acknowledgment, and an invoice.

4. The system of claim 1, wherein the clearinghouse computer server includes a supplier managed inventory component configured to monitor an inventory of the first trading member and in response to the inventory reaching a preset level, and further configured to generate and transmit a purchase order to the second trading member that was pre-designated as a supplier for the first trading member.

5. The system of claim 1, wherein at least one of the plurality of member businesses is a shipping company and the clearinghouse computer server includes a shipment tracking component configured to receive shipment tracking information from the shipping company and to provide the shipment tracking information to the member businesses.

6. The system of claim 1, wherein the clearinghouse computer server includes a business intelligence component configured to aggregate data passing through the clearinghouse computer server and configured to mine the aggregated data for information requested by the member businesses.

7. The system of claim 1, wherein at least one of the plurality of member businesses is a shipping company and the clearinghouse computer server includes a logistics procurement component configured to receive shipment requests from trading members and configured to forward shipment proposals from the shipping members to the trading members.

8. The system of claim 1, wherein the messages are extensible markup language (XML) messages.

9. The system of claim 1, wherein the clearinghouse computer server includes a product catalog component configured to store a product catalog of products available for sale from the member businesses and forward results of search requests of the catalog to the member businesses.

10. The system of claim 1, wherein the clearinghouse computer includes a regulatory reporting component configured to receive information relating to a required regulatory report from one of the member businesses, to generate a regulatory report for the one member, and to transmit the report to an appropriate regulatory authority.

* * * * *

(12) INTER PARTES REEXAMINATION CERTIFICATE (610th)
United States Patent
Chvala et al.

(10) Number: US 7,451,107 C1
(45) Certificate Issued: Jun. 3, 2013

(54) BUSINESS-TO-BUSINESS ELECTRONIC COMMERCE CLEARINGHOUSE

(75) Inventors: Richard J. Chvala, Midlothian, VA (US); Mason A. Moore, Richmond, VA (US); Michael F. Giesler, Midlothian, VA (US)

(73) Assignee: Supply Chain Connect, LLC, Houston, TX (US)

Reexamination Request:
No. 95/001,651, Jun. 9, 2011

Reexamination Certificate for:
Patent No.: 7,451,107
Issued: Nov. 11, 2008
Appl. No.: 09/493,794
Filed: Jan. 28, 2000

(51) Int. Cl.
*G06Q 40/00* (2006.01)

(52) U.S. Cl.
USPC ............................................. 705/37

(58) Field of Classification Search
None
See application file for complete search history.

(56) References Cited

To view the complete listing of prior art documents cited during the proceeding for Reexamination Control Number 95/001,651, please refer to the USPTO's public Patent Application Information Retrieval (PAIR) system under the Display References tab.

*Primary Examiner* — Jeffrey Carlson

(57) ABSTRACT

A business-to-business transaction clearinghouse integrates the traditional point-to-point business supply chain at the clearinghouse. The clearinghouse provides cost effective access to a wide variety of members and includes value-added services. Members of the clearinghouse can include trading members, members that help the trading members ship their products, and banking members. The clearinghouse facilitates business among the trading members by providing a single point of contact for all transactions. The clearinghouse can be specific to an industry, such as the chemical industry. Multiple industry specific clearinghouses may form a network clearinghouses to effectively create one larger and more general business-to-business electronic commerce community.

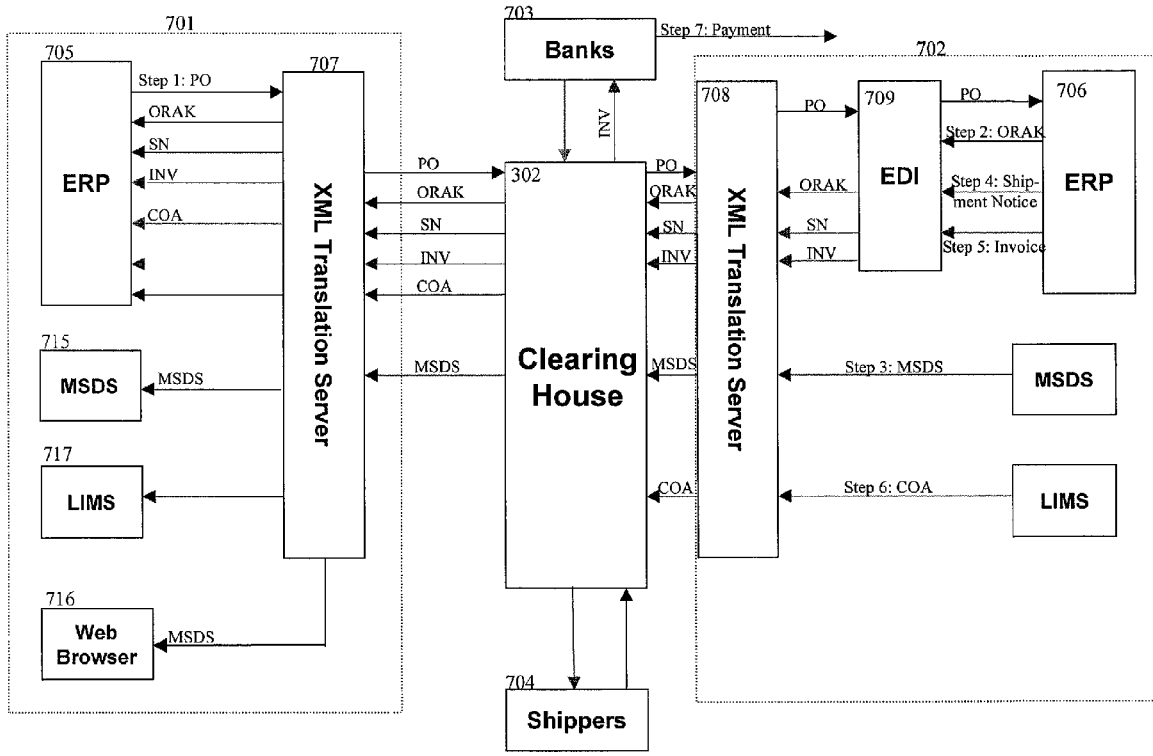

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-10 are cancelled.

\* \* \* \* \*